Oct. 11, 1932.  C. L. HANCOCK  1,881,530
TRAP
Filed July 23, 1930  3 Sheets-Sheet 1

INVENTOR
C. L. Hancock
BY
ATTORNEY

Oct. 11, 1932.       C. L. HANCOCK        1,881,530
TRAP
Filed July 23, 1930       3 Sheets-Sheet 2

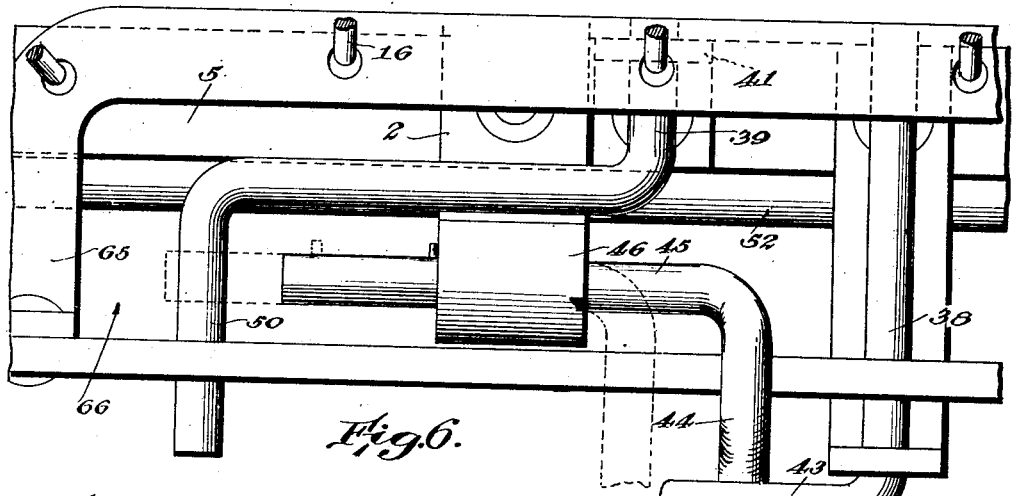
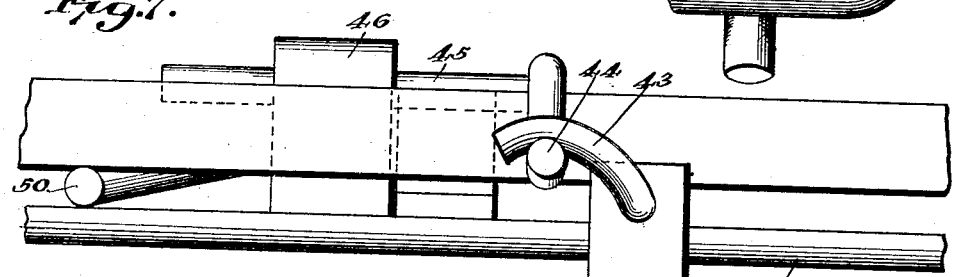
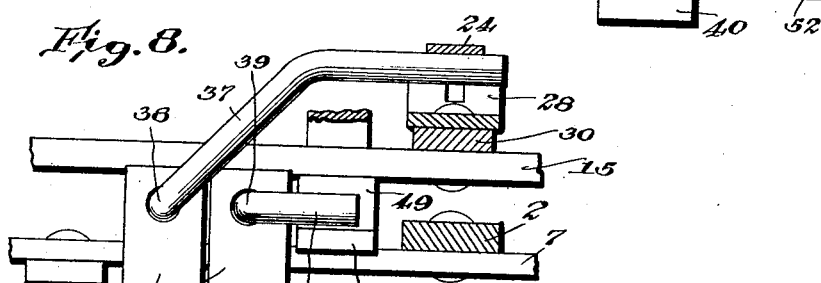

Patented Oct. 11, 1932

1,881,530

UNITED STATES PATENT OFFICE

CHARLES LEON HANCOCK, OF TUTHILL, SOUTH DAKOTA, ASSIGNOR TO ANIMAL TRAP COMPANY OF AMERICA, OF LITITZ, PENNSYLVANIA, A CORPORATION OF PENNSYLVANIA

TRAP

Application filed July 23, 1930. Serial No. 470,174.

This invention relates to improvements in traps for catching animals, birds, etc. alive and uninjured, and it consists of the constructions, combinations and arrangements herein described and claimed.

An object of the invention is to provide a trap having a hood in the nature of a chain mat or other flexible cover arranged to be thrown over an animal or bird which has entered to spring the trap.

Another object of the invention is to provide a trap structurally arranged to fit the physical contour or surroundings of the habitation of the animal, a particular feature of this arrangement in the present trap being a stationary trap base, either originally fixed or adjustable to desired stationary positions, which is angled to fit the slope of a muskrat hut, or river bank and thereby provide an elevated perch to which the animal can cling when the hood is sprung to the closed position. A further object of the invention is to provide a trap in which the flexible cover or hood can be so disposed that the animal does not have to come in contact with it in entering the trap, thus leaving the tread pan out in the open with nothing to arouse the animal's suspicions.

A further object of the invention is to locate the tread pan slightly below the water level along the line of travel of the animal, in line with the hood and close up to the base of the hut, thus insuring the presence of the animal entirely within the trap before it can be sprung.

A further object of the invention is to provide a pinning arrangement enabling setting the trap and properly holding it in the set position in any ordinary depth of water.

A still further object of the invention is to provide a trap in which the trap structure is movable to an elevated position when sprung, thus to avoid drowning the captured animal.

Other objects and advantages will appear in the following specification, reference being had to the accompanying drawings in which Figure 1 is a plan view of the improved trap in the set position.

Figure 6 is a detail plan view of the interlocking elements of the trigger structure in Figure 1.

Figure 7 is a detail front elevation of the structure in Figure 6.

Figure 8 is a detail sectional view taken on the line 8—8 of Figure 1.

Figure 9 is a sectional view taken on the line 9—9 of Figure 1.

The herein disclosed trap is described as being used for catching muskrats, but this particular use is intended merely as one illustration because it can be employed to equally good advantage in trapping other animals with but little modification in its minor features.

The muskrat to-day is being bred to an enormous extent in various parts of the country so that quite an industry has developed concerning it. One of the main objects in the development of this industry is the obtaining of its pelts which not only have a fair wearing quality, but can be put to a great variety of uses. It is a consideration to catch the animals alive, not only from the standpoints of avoiding injury to the pelts and killing some not wanted but also from the standpoint of humaneness in avoiding the causing of suffering.

Traps now in use generally operate in such a way that the muskrat is drowned upon being caught. This is undesirable for several reasons, and one of the purposes of the present trap is to instantly elevate the muskrat above the water level as soon as the trap is sprung.

Figure 2:
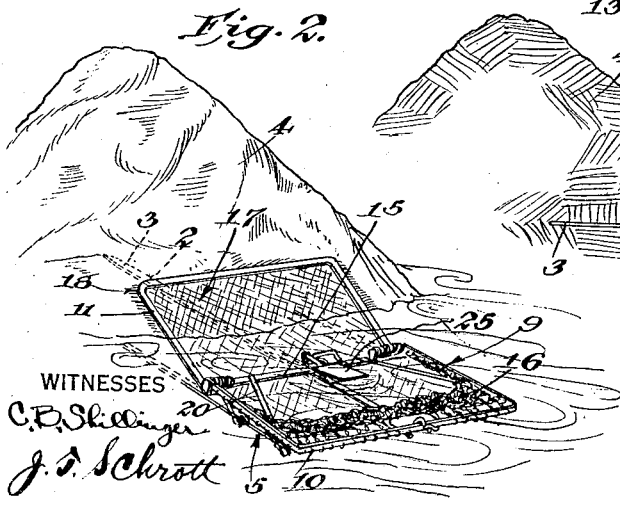
Figure 2 is a perspective view illustrating the manner of pinning the trap to a muskrat hut.
Figure 3:
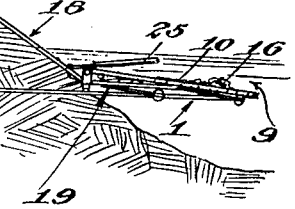
Figure 3 is a sectional view of the hut showing how practically everything is concealed from view by submersion in the water close up to the base of the hut and in the line of travel of the animals.
Figure 5:
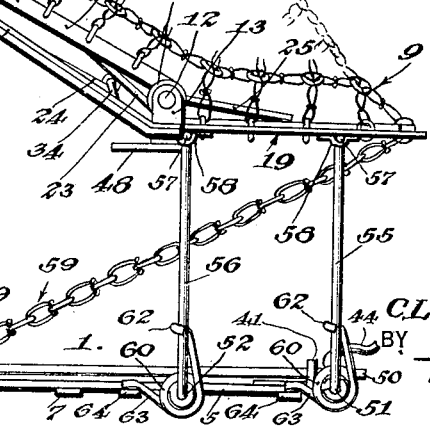
Figure 5 is a side elevation of the trap in the sprung and elevated position.

The trap comprises a stationary sub-base generally designated 1 (Figs. 3 and 5). This comprises a long central stake 2 which is pointed at the end 3 (Figs. 2 and 3) so that it can readily be thrust into the side of a muskrat hut 4 (Figs. 2 and 3), bank of a river or wherever it is desired to pin the trap in a fixed position.

To this end the pinning arrangement is not necessarily confined to the central, horizontal arrangement of the stake 2, since this may extend off at angles from other selected points on the trap with the same effect. The sub-base comprises a frame of which a U-bar 5 (Figs. 1 and 4) and a pair of cross bars 6, 7 (Fig. 4) are parts.

The free ends 8 of the U-bar 5 at the rear of the cross bar 7 are intended to be thrust into the hut 4 or to rest upon such conventionally located natural formation as will stabilize the trap and prevent it from being tipped over. The left side of the trap in the drawings is herein known as the rear, while the right side, from which the animal customarily enters by swimming in the water, is known as the front.

A trap structure, generally designated 9, (Fig. 5) is that part of the trap by which the animal is actually caught. This comprises a movable hood frame 10 and a relatively stationary trap base 11. The frame 10 is pivoted by means of pins 12 upon ears 13, 14, the former being bent up from the ends of a medial bar 15 on the base 11, to which bar the ears 14 are secured. The base 11 is stationary relatively to the frame 10.

In other words, the frame 10 is capable of being opened and closed in respect to the base 11, and when closed will hold a chain mat or other flexible cover 16 in an encompassing position over the trapped animal. The movable hood frame 10 and its flexible cover 16 are collectively known as the hood.

Respecting said cover 16 it should be explained that the specification of a chain mat is not to be regarded as a limitation, it being possible to form the hood in some other collapsible manner. The bottom of the trap base 11 consists of wire netting, network or reticulated material 17 or any desired equivalent.

An offset in the base 11 along the medial bar 15 (Fig. 5) defines an angled back stop or elevated perch 18 and a horizontal portion or step 19. The angle of the perch 18 is intended to match the slope of the hut 4, the particular purpose being to enable thrusting the perch 18 against the side of the hut and thus materially augment the firm holding quality of the pinning arrangement. In practice it is possible to make the perch 18 adjustable so that various inclinations of huts and river banks may be accommodated.

On this principle the perch 18 is regarded as being elevated in respect to its horizontal portion 19, it even being within the present contemplation to make the perch 18 perfectly upright in respect to its base. Furthermore, taking the trap as shown, the effect of adjustment of the perch 18 will be had by thrusting the stake 2 and ends 8 into a support in such a direction that the perch will stand in the required position. For instance, should it be desired to mount the trap on a substantially vertical river bank the stake 2 and ends 8 will be thrust into the bank in an upward direction, disposing the perch 18 substantially upright.

The purpose in making the member 18 of network or other reticulated material is to convert said member into an elevated perch, so to speak. This part of the trap will be out of the water and inasmuch as the animal will be confined adjacent to it the provision of network affords something for it to cling to.

Diagonal braces 20 (Fig. 1) are connected between the bar 15 and the remote sides of the horizontal step 19 to provide mountings for one end 21 of each of a pair of springs 22. These are coiled about the pins 12 and have the other ends 23 (Fig. 5) so connected with the hood frame 10 as to swing the latter over to the closed position when a trigger 24 (Figs. 1 and 9) is released by the stepping of the animal upon a tread pan 25.

The tread pan has a lug 26 (Fig. 9) which is suitably pivoted at 27 in a slotted loop 28 of a metal strap 29 that is riveted to a bridge 30 extending from the medial bar 15 to the front bar 31 of the step 19. A notch 32 (Fig. 9) in the lug 26 receives the point of the trigger 24, and as long as the trigger remains in this notch the trap remains set. The trigger is pivoted at 33 to an upwardly bent rear end 34 of the strap 29.

Figure 1:
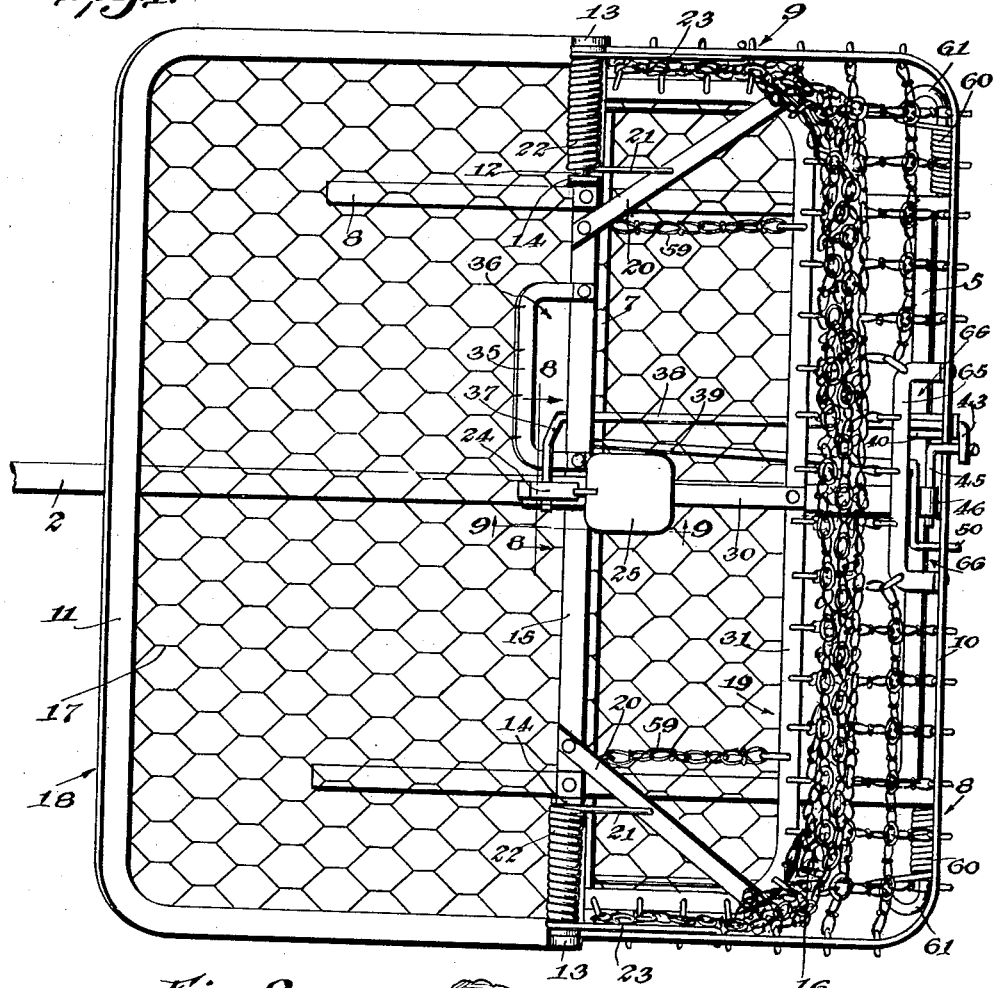

A metal loop 35 (Figs. 1 and 4), secured in an outstanding position upon the medial bar 15 defines an opening 36 unobstructed by the wire netting 17 in which a bent finger 37 (Fig. 4) of one of a pair of lock rods 38, 39 is movable to assume a holding down position under the trigger 24 (Figs. 1, 8, and 9).

Figure 4:
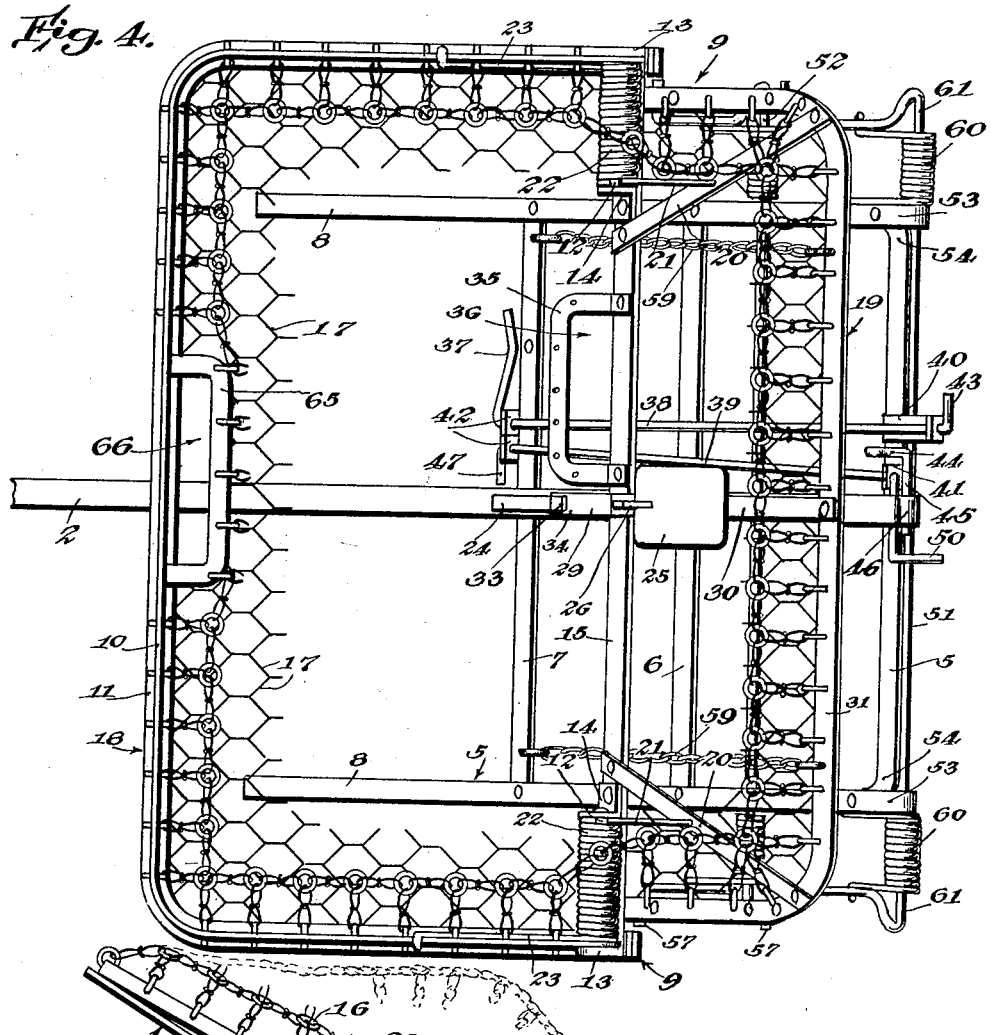
Figure 4 is a perspective view illustrating the trap in the sprung position, most of the wire netting of the trap base being omitted to avoid obscuring the trigger structure.

These lock rods are journaled at the front in brackets 40, 41 secured to the front of the U-bar 5, and at the rear in brackets 42, secured to the cross bar 7. In addition to the bent finger 37 the rod 38 has a hook 43, this being located at the front (Figs. 1, 4 and 6). This hook is curved (Fig. 7). It is engageable with a detent 44 of a shank 45 which is slidable in a bearing 46. The bearing is formed by curling the front end of the stake 2.

The purpose of the detent is to hold the hood frame 10 down when the trap is in the set position (Fig. 1). It is then the engagement of the hook 43 over the detent and, in turn, the engagement of the bent finger 37 beneath the trigger 24 that maintains this position until the tread pan 25 is touched. This will free the detent 44 so that the hood snaps over to the closed position by virtue of the tension of the springs 22 upon it.

A detent hook 47 (Figs. 4 and 8) on the rear end of the lock rod 39 is engageable with a tongue 48 (Figs. 5 and 9) secured to and spaced a slight distance as at 49 (Fig. 9) below the medial bar 15. The front end of the lock bar 39 is converted into a crank 50 (Figs. 4 and 6) by which the detent hook 47 is conveniently turned toward the left (facing the front of the trap) to engage and catch the tongue 48 and temporarily hold the trap structure 9 when pressed down to the set position in reference to the sub-base 1. It is by means of the detent hook 47 that the trap structure 9 is held down in the set position.

The depressed and elevated positions of the trap structure 9 imply movements of which the trap 9 is capable relative to the sub-base 1 according to the instant showing. There may be cases in which such relative movements are neither desired nor provided for, in which event the trap structure 9 would be directly pinned to a support rather than through the medium of the sub-base 1.

A pair of shafts 51, 52 (Figs. 4 and 5) is journaled upon the U-bar 5 of the sub-base 1, brackets 53 being extended from the front of the U-bar 5 to avoid the rounded corners 54 of the latter and to provide the supports for the front bar 51. These bars are formed to provide pairs of rocker arms 55, 56, the extremities of which are bent to provide pintles 57 (Figs. 4 and 5) which are received by bearing straps 58 on the nether side of the horizontal step 19.

This arrangement of the shafts 51, 52 and rocker arms 55, 56 makes possible the free up and down swinging of the trap structure 9 with reference to the sub-base 1, the twin arrangement producing a parallel motion which is designed to keep the step 19 parallel with the sub-base. Chains 59, secured to the cross bar 7 and to the front bar 31 (Fig. 1) limit the forward and upward motion of the trap structure 9 under the influence of springs 60 (Figs. 4 and 5). These springs are coiled about those portions of the shafts 51, 52 extending beyond the sides of the sub-base 1 as illustrated at 61 in the instance of the shaft 51 in Figure 5. The ends 62, 63 of the springs are respectively applied to the rocker arms 55, 56 and to stops 64 on the sub-base to enable them to apply their tension to the elevation of the trap structure 9 when permitted to do so.

A metal loop 65 (Figs. 1 and 4) similar to the metal loop 35, is attached to the hood frame 10 in order to define a clear place or opening 66 in the chain mat 16 in the region of the interlocking elements 43, 44, etc. at the front of the trap. This loop is intended to avoid any possibility of the links of the chain mat becoming entangled so that the closing of the hood would be interfered with.

The operation is readily understood. The trap is set by placing it on a floor or other support with the stake 2 and free ends 8 of the U-bar 5 pointed away from the operator.

The hook 43 and crank 50 of the lock rods 38, 39 are turned to the right as far as they will go. Both hands are now placed on the side edges of the trap structure 9 (Fig. 5) and pushed upon in the downward and backward directions, by which act the arms 55, 56 (Fig. 5) rock until the trap structure 9 reaches the sub-base 1. The position thus arrived at is illustrated in Figure 1.

Now turn the crank 50 to the left. This causes the detent hook 47 to engage the tongue 48 (Figs. 8 and 9). The shank 45 is next shoved over to the left as far as it will go (dotted lines Fig. 6) so that it comes to rest over the crank 50. This temporarily holds the crank down and the lock rod 39 in position so that the trap structure 9 cannot again swing upwardly which the tension of the springs 60 (Fig. 5) tends to cause it to do.

The detent 44 must be turned vertically in order to pass through the opening 66 (Fig. 4) when the hood frame 10 is swung toward the set position. Since the trap structure 9 is now properly although temporarily fastened down to the sub-base 1, the operator takes hold of the hood frame 10 and swings it over toward him about three-fourths of the way and holds it there with one hand while he picks up the chain mat or other flexible cover in the center with the other hand thus pulling it up from the ends so that it will not bind between the frame 10 and the sub-base 1.

Having done this the frame 10 is pushed all the way down. The detent 44 is now turned over the front bar of the movable frame 10 (Figs. 1, 6 and 7) at the same time sliding the shank 45 to the right. The crank 50 is now released by the left end of the shank 45 but the front bar of the frame 10 acts in its stead to prevent the rising of the trap structure 9 by force of the springs 60 (Fig. 5). The shifting of the shank 45 to the right is a requisite which is purposely incorporated in the trap.

If the setting of the trap ended with sliding the shank 45 to the left into engagement with the crank 50 there is a possibility that the shank 45 might be forgotten, hence the temporary holding quality that it is intended to have would be converted into a permanent holding quality which would prevent the springing of the trap.

But by sliding the shank 45 to the right, as stated, there is no chance of forgetting to complete the setting of the trap because if the detent 44 were not then held down the frame 10 would fly up. Having gotten the detent 44 into the position in Figures 1 and 6 the bent finger 37 (Fig. 4) is used as a lever to turn the lock rod 38 to the left and force the hook 43 down on the end of the detent 44 (Figs. 1 and 6).

The next act is to bring the trigger 24 forward over the bent finger 37 (Fig. 1) and to engage the free extremity of it with the notch 32 of the pan 25. The trap is now in the set position.

By carefully taking hold of the trap it can be put in place beside the muskrat hut 4 by simply pushing the stake 2 into the pile. The flexible cover 16 must be gathered in both hands, beginning at the outer edge, and folded or rolled together in such a way around the outsides of trap base portion 19 that it will be as far away as possible from the tread pan 25.

Since the flexible cover 16 and the adjoining parts of the trap structure 9 are under water (Fig. 3) it follows that the tread pan 25 will occupy a position directly in the line of travel of the muskrats. These usually swim around the hut 4, and upon swimming into the trap come in contact with the tread pan only to release the trigger 24 and cause the springing of the trap. The first act is snapping over of the hood into the closed position (Figs. 4 and 5). This occurs by force of the springs 22. The next act is the bodily raising of the trap structure 9 out of the water and away from the hut 4. This occurs by force of the springs 60 and rocker arms 55, 56 (Fig. 5). The animal is caught without injury and there is no possibility of its drowning.

In conclusion it is desired to elaborate on the usefulness and other qualities of the trap. First of all, it is a humane trap. Much is being done and said at the present time about humane traps. The instant trap, fulfills all of the requirements inasmuch as the captured animal does not receive any injury of any kind, and being entirely encompassed with the chain mat are defended from hurting themselves by fighting after being caught as well as protected from other animals that are antagonistic to them.

The practice of muskrat breeders is to exchange the male rats from season to season in order to guard against inbreeding. This makes it imperative to catch the animals alive and unhurt for very often unwanted animals will be trapped and if injured in doing so will result in a wholly unwarranted destruction.

Another circumstance of usefulness of the trap occurs during which trapping of certain animals is permissible in some states and trapping of others is forbidden. Should any of the forbidden animals be caught during a closed season they are readily liberated since by use of this trap they are caught alive. In other types of traps forbidden animals maimed or killed during a closed season would result in a fine for the offending trapper.

The foregoing description is confined solely to the setting of the trap in water. Everything is concealed under water excepting the elevated perch, and no attempt is or need be made to conceal that. The instinctive nature of muskrats indicates that they like to crawl up on an object such as the elevated perch, while with other animals, as when the trap is set on land, that would not be the case.

In cases where the trap is set on land everything would have to be concealed, and rather than have the perch 18 inclined at an angle it would have to be made level with the ground. The tread pan as well as other parts would be covered with dirt, grass or leaves.

While the construction and arrangement of the improved muskrat trap is that of a generally preferred form, obviously modifications and changes may be made without departing from the spirit of the invention or the scope of the claims.

I claim:—

1. In a trap, a sub-base having a stake to be thrust into a support and means spaced from the stake to engage the support and stabilize the trap.

2. A trap comprising a sub-base arranged to be fixed, a spring pressed trap structure arranged to be moved against the tension of its spring to a set position upon the sub-base, a lock rod carried by the sub-base and means on a part of the lock rod and on the trap structure to be mutually engaged when the trap structure assumes the set position, and means on the sub-base to then engage another part of the lock rod to maintain said mutual engagement.

3. In a trap, a sub-base arranged to be fixed, a spring pressed trap structure arranged to be moved against the tension of its spring to a set position upon the sub-base, a lock rod carried by the sub-base having a detent hook at one end and a crank at the other, a tongue on the trap structure arranged to be engaged by the detent hook when in the set position on turning the crank in one direction, and a shank carried by the sub-base being engageable with the crank to prevent turning in the other direction.

4. In a trap, a sub-base arranged to be fixed, a spring pressed trap structure for assuming a set position upon the sub-base against the tension of its spring, said trap structure including a spring pressed movable hood and and a tread pan, a coacting trigger arrangement, and means on the sub-base movable into one position to cause the trigger arrangement to temporarily hold the trap structure in the set position on the sub-base prior to opening the hood, then into a second position to cause said trigger arrangement to hold the hood open.

5. A trap comprising a trap base having a bend therein to dispose one part at an angle to the other part and enable fitting the trap close up to the line of travel of an animal, a covering hood hinged to said base so as to move over said angled part into a covering position, and trigger means to hold said hood open, including a releasing tread pan situated in approximate line with the bend and in the natural line of travel of the animal.

6. A trap comprising a base, means to secure the base to a support in a position of projection of a portion thereof out of a body of water to act as an elevated perch, a covering hood, and trigger means to temporarily hold the covering hood down next to the water in an open position, said means including a tread pan located near the support substantially at water level.

7. A trap comprising a base, means to dispose the base next to a support in a position of projection out of a body of water to act as an elevated perch, a covering hood, a hinge arrangement located substantially at water level and movably connecting the covering hood to the first-named base, and trigger means to temporarily hold the covering hood down next to the water in an open position, said means including a tread pan in approximate line with the hinge arrangement.

8. A trap comprising a base, means to dispose the base on an incline to act as an elevated perch, a covering hood, a hinge arrangement movably connecting the covering hood to the bottom of the first-named base, trigger means to temporarily hold the covering hood horizontally open substantially at water lever, and a tread pan operable to release the trigger means being located above the covering hood and near the base of the fixed base.

9. A trap comprising mounting means, a reticulated base portion disposed on an incline to said mounting means and extending to an elevation thereabove, said portion constituting an elevated perch, a covering hood, means by which the covering hood is hingedly mounted at the approximate base of the reticulated portion being movable upwardly toward and against the reticulated portion and over an animal perched thereon, a trigger arrangement for holding the movable hood in an open position, and a tread pan for releasing the trigger arrangement also being located at the base of the reticulated portion.

10. A trap comprising a member of meshed material consisting of base and perch portions disposed at angles to each other, mounting means in reference to which said base portion assumes a substantially horizontal position and in reference to which the perch portion stands on an upward inclination to constitute an elevated perch, a movable hood frame hinged substantially along the dividing line between the base and perch portions of said member, a flexible cover attached to the movable hood frame and base portion, being foldable substantially around the outsides of the base portion when the movable hood frame is set and covering parts of both the base and perch portions when the hood frame is closed, a trigger arrangement for holding the hood frame open, and a tread pan for releasing the trigger arrangement being located substantially at the juncture between the base and perch portions.

11. A trap comprising a trap base having an upwardly inclined portion providing an elevated perch, a movable hood and means for moving the hood to a closed position in respect to the elevated perch, and means for movably mounting the hood on the trap base.

CHARLES LEON HANCOCK.